United States Patent [19]

Gauler

[11] Patent Number: 5,269,677
[45] Date of Patent: Dec. 14, 1993

[54] HOT PASSAGE MANIFOLD SYSTEM

[75] Inventor: Kurt Gauler, Erzhausen, Fed. Rep. of Germany

[73] Assignee: Incoe Corporation, Troy, Mich.

[21] Appl. No.: 752,056

[22] Filed: Aug. 29, 1991

[30] Foreign Application Priority Data

Sep. 10, 1990 [DE] Fed. Rep. of Germany ....... 4028660

[51] Int. Cl.$^5$ ............................................. B29C 45/22
[52] U.S. Cl. .................................. 425/568; 264/297.2;
264/328.1; 425/570; 425/571; 425/572
[58] Field of Search ............... 425/549, 570, 571, 572, 425/567, 568; 264/328.15, 297.2, 328.1

[56] References Cited

U.S. PATENT DOCUMENTS 4,266,723 5/1981 Osuna-Diaz ..................... 425/549
5,028,227 7/1991 Gellert ........................... 264/328.15

FOREIGN PATENT DOCUMENTS 367684 7/1982 Austria .
0167977 1/1986 European Pat. Off. .
3837375 6/1989 Fed. Rep. of Germany .

OTHER PUBLICATIONS

Goldbach, Hubert; "Heiskanal-Werkzeuge fur die Verarbeitung Technischer Thermoplaste (wie ABS, PA, PBTP, PC)", pp. 150–154.

Primary Examiner—Tim Heitbrink
Attorney, Agent, or Firm—Brooks & Kushman

[57] ABSTRACT

A hot passage nozzle system including a manifold block, nozzle plate and one or more sprue bushings. At one end the sprue bushings are screwed into mating receptacles in the manifold block and centered at the exit openings of the material passageways in the block. The other ends of the sprue bushings are centered in the nozzle plate. The sprue bushings have annular grooves adjacent the connection with the manifold block creating points of flexure in order to accommodate dimensional changes due to temperature changes during use, and also to accommodate manufacturing tolerances.

20 Claims, 1 Drawing Sheet

HOT PASSAGE MANIFOLD SYSTEM

TECHNICAL BACKGROUND

The present invention relates to a hot passage manifold system for supplying molten synthetic thermoplastic materials to injection molding tools. The system includes a heated manifold block with distribution passages arranged at a distance above a nozzle plate and a plurality of sprue bushings arranged in recesses in the nozzle plate. The sprue bushings are heated and tightly connected to exit openings in the distribution passages.

BACKGROUND OF THE INVENTION

Hot passage manifold systems serve to convey molten synthetic material, plasticized by heating, to injection molds. The manifold block distributes the molten plastic to one or more sprue bushings through passages in the block. For smaller injection casting molds,, a single sprue bushing may be sufficient, although for larger injection casting molds designed to produce larger injection molded parts or a plurality of injection molded parts, several sprue bushings may be required in order to supply the molten synthetic material to the mold(s) in several locations.

In general, the sprue bushings are set into recesses in the nozzle plate, their upper ends in contact with the lower surface of the manifold block. To achieve a tight connection between the sprue bushing and the lower surface of the manifold block, the manifold block is pressed against the end surfaces of the sprue bushings by a top clamp plate, or the manifold block is screwed to the nozzle plate. Also, at the juncture between the exit openings of the manifold block passageways to the cavities of the sprue bushings, seals are used to prevent leakage. The seals typically are situated in upwardly flared end portions of the sprue bushing cavities.

Since the sprue bushings are centered in the recesses of the nozzle plate, and since expansion occurs in the manifold block ark a result of temperature changes, there often are misalignment in the region of the seals between the upper end surfaces of the sprue bushings and the smooth lower surface of the manifold block. Due to such misalignments, and particularly due to the flared end portions of the sprue bushings which accommodate the seals, cutbacks or steps are formed in the region of the transition from manifold block to sprue bushings, and these may interfere with the smooth flow of molten material. This is a drawback particularly during the injection molding of sensitive synthetic materials. The areas formed by the cutbacks or steps may retain remnants of synthetic material which will suffer thermal damage due to the lengthy exposure to heat.

Also upon a change in color of molten synthetic plastic materials, such retained remnants present a problem because they may contaminate the color of the molten synthetic materials which are subsequently injected. A change of color therefore requires a dismantling and cleaning of the system creating a wasteful and time-consuming mode of operation.

Further, an interruption of the smooth flow of molten synthetic material interferes with the circulation of the molten material and this has been known to impair the quality of molded parts especially when sensitive synthetic materials are used.

Conventional connection mechanisms between the manifold block and the sprue bushings have the further disadvantage that the electric wiring of the heating system of the manifold block and of the heating coils or jackets of the sprue bushings cannot be completed before assembly with the injection molding molds. The electrical installation must be executed in the course of tooling, although the personnel specialized in tooling are not as a rule trained electricians. Moreover, since the electric wiring will be completed in the tooling shop, there often is no warranty for proper electrical connection and operation.

An object of the invention, then, is to provide a hot passage manifold system of the type above mentioned that can be completed as a structural and electrical unit before being connected to the nozzle plate of the injection mold. Another object is to provide a hot passage manifold system that contains no steps, offsets or cutbacks which might interfere with the flow of molten synthetic material in the area of transition between the manifold block and the sprue bushings.

Still another object is to provide a hot passage manifold system which accommodates expansion of the manifold block and other parts of the system without any resultant misalignment or displacement between the sprue bushings and the manifold block. A still further object is to provide such a system in which the sprue bushings remain centered in the nozzle plate and remain in registry with the manifold block at all times.

The above and other objects are accomplished according to the present invention, by providing a system in which the sprue bushings, by virtue of threaded nipples at the inlet end, are screwed sealingly into threaded holes at the corresponding exit openings of the passageways in the manifold block. Also, the sprue bushings have a predetermined point of flexure near the inlet end and peripheral centering members at their other ends. The recesses in the nozzle plate taper down to a centering portion and accommodate the peripheral centering members.

By virtue of the fixed screw-in connection between the sprue bushings and the manifold block, a smooth passage transition exists between the block and the bushings. The secure connection along with the sprue bushing flexure means prevents or minimizes any relative misalignment between the manifold block and the sprue bushings. Thus, there are no interruptions or offsets in the walls of the passageways which would affect the flow of molten synthetic material.

In order to absorb the unavoidable heat expansions of the manifold block, the sprue bushings are centered in the nozzle plate adjacent their exit ends into the mold, and have predetermined points of flexure adjacent their inlet ends, preferably formed by one or more outer annular peripheral grooves in the sprue bushings. The sprue bushings thus are able to bend at the predetermined point of flexure in response to changes in length of the manifold block due to temperature changes, while the opposed lower ends of the sprue bushings are fixed in the nozzle plate.

The limited mobility of the sprue bushings as provided by the predetermined point of flexure also facilitates manufacture and assembly. Unavoidable manufacturing tolerances on the location of the sprue bushings and recesses are compensated by this mobility.

The structural unit consisting of manifold block and sprue bushings, including associated electrical systems, can be fabricated at one time. This makes possible an inspection and final clearing of the electrical system on the manufacturer's premises, before the structural unit is delivered to the tooling shop. There the structural unit consisting of manifold block and screwed-in sprue bushings including electrical system is mounted on the nozzle plate of the injection molding mold, the sprue bushings being introduced into the corresponding recesses. Since the recesses taper down to the centering portion, the sprue bushings are automatically centered when the structural unit is mounted, thus obviating the need for any separate centering operation. This eliminates the need to inspect the seals between the sprue bushings and the manifold block at assembly, since a tight seal has already been provided when the sprue bushings are screwed into the manifold block. As a result, any problems that may result from leakage of molten plastic in the region between the sprue bushings and the distribution block are eliminated or minimized, as are any problems due to faulty electric wiring.

In the region of connection of the sprue bushings to the manifold block, there also is no wear due to relative motion between the sealing surfaces, and there are no sealing rings which need to be replaced. Production rejects due to problems stemming from movement in the region of connection between the sprue bushings and the manifold block are thus eliminated. Costly and time consuming repairs are also minimized or eliminated in this region.

The smoothness of the passage of the flow of molten synthetic material in the region of connection between the sprue bushings and the manifold block makes possible an unimpeded flow, so that even highly sensitive synthetic materials can be optimally processed. Also changes of color can be carried out quickly because no remnants of plastic are left behind.

According to a preferred embodiment of the invention, cylindrical centering segments are situated adjacent to the internal threads at the exit openings of the manifold passages. These centering cylindrical surfaces help to center the sprue bushings in the manifold passageway outlets. In this manner, accurate centering is achieved between the sprue bushings and the manifold block without independent guiding, thereby ensuring a smooth passage at the point of transition.

Other advantageous embodiments of the invention will become apparent from the following description of the invention and appended claims. Also, the invention is illustrated below in more detail in connection with a preferred embodiment shown in the drawing.

BEST MODE(S) FOR CARRYING OUT THE INVENTION

Figure 1:
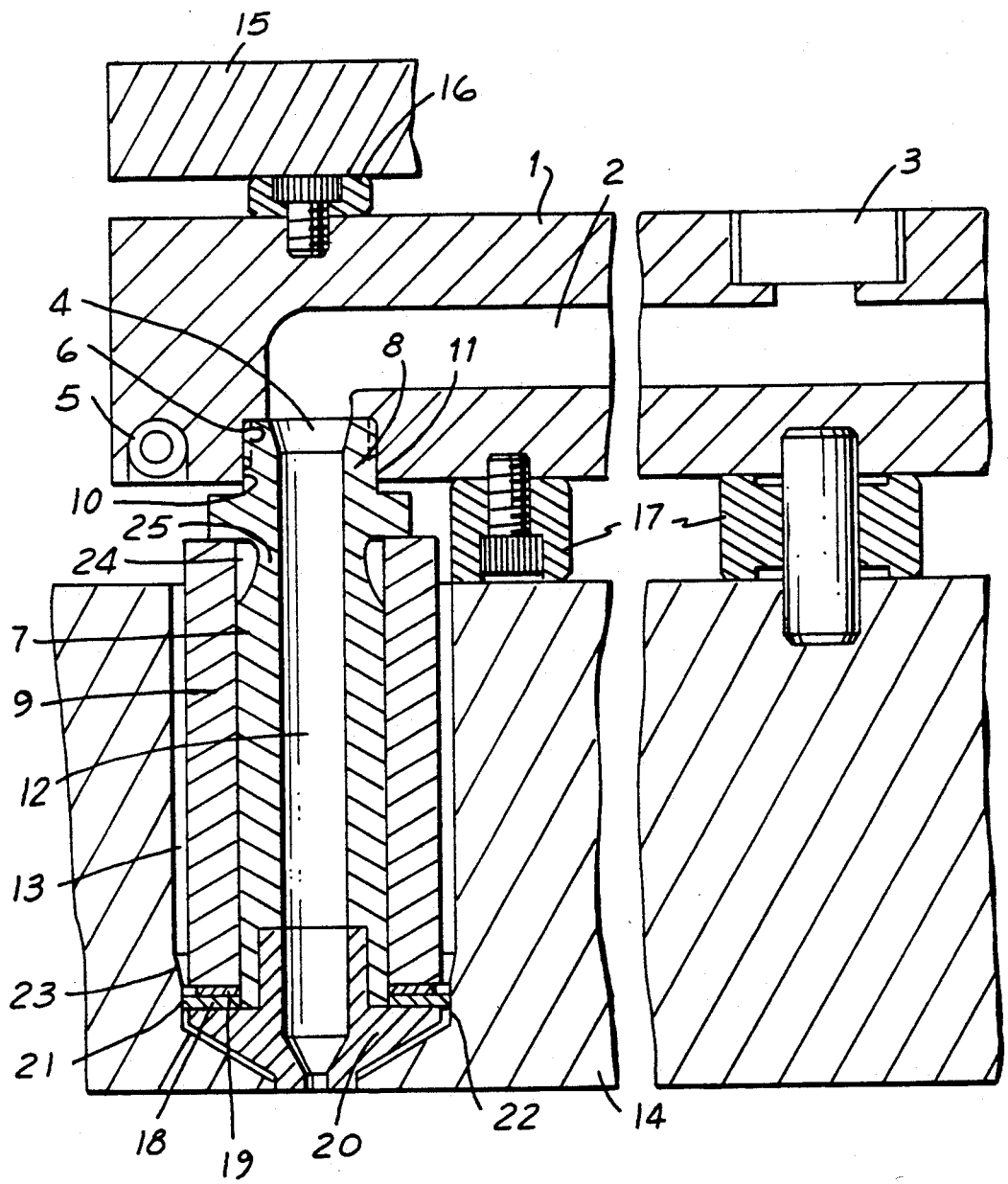
FIG. 1 shows a partial vertical section of the inventive hot passage manifold system for an injecting molding system.

A manifold block 1 comprises passages 2 conveying the heated, plasticized melt of synthetic material, delivered for example by a heated extruder (not shown), from a central connection 3 to a plurality of exit openings 4. The manifold block 1 is electrically heated by one or more tubular heating elements 5.

At each exit opening 4 (in the drawing, for the sake of simplicity, only a single exit opening 4 is shown), an internal thread 6 is provided, into which a sprue bushing 7 is screwed by a threaded protrusion or nipple 8 at its upper end. Each sprue bushing 7 has a substantially tubular construction and is encircled by an electric heater, such as a coil heater or heating jacket 9 as shown in FIG. 1.

Immediately adjacent the internal thread 6 in the direction towards the sprue bushing 7 is a cylindrical centering segment 10. The segment 10 is adapted to mate with a cylindrical centering surface 11 on the bushing 7 and thus center the bushing in the exit opening 4. In this manner, the exit opening 4 of the passage 2 makes a smooth transition, with no step or offset, into a central bore 12 of the sprue bushing 7.

The sprue bushing 7 is positioned in a bore or recess 13 in the nozzle plate 14. The plate 14 is situated at a distance from the manifold block 1 and forms a part of the injection molding mold (not shown) in which the molten material is to be injected. A top clamp plate is bolted therefor to the nozzle plate 14 with a plurality of (tension) screws in such manner as to fixedly position the manifold block 1 between them. Spacers 16 and 17 are positioned respectively between the top clamp plate 15 and manifold block 1 and between the nozzle plate 14 and the manifold block 1 in order to maintain them a prespecified distance apart.

Due to the threaded connection and mating centering surfaces, the upper end of the sprue bushing 7 is tightly and rigidly connected to the manifold block 1. The bushing 7 is also centered in the recess 13 in the nozzle plate 14 at its lower end. For this purpose, an annular guide washer 18 is positioned on the lower end of the sprue bushing. The guide washer 18 is held between the heating jacket 9 and the nozzle cap 20 of the sprue bushing 7. An insulating washer 19 is positioned adjacent the guide washer to insulate it from the heater. The guide washer 18 provides a circumferential centering surface 21 around its periphery and is fitted into a cylindrical centering segment 22 of the recess 13. As shown in the drawing, the recess 13, which forms an air gap around the outer surface of the heating jacket 9, narrows down to the centering segment 22 by way of a tapered guide segment 23.

The tubular cylindrical shaft of the sprue bushing 7 has a peripheral groove 24 near its upper end. The groove creates an area of thinner wall thickness on the bushing and forms a predetermined point of flexure 25 near the top of the bushing 7. The notions of "top" and "bottom" in this context refer to the arrangement in the drawing; it will be understood that the hot passage manifold system shown may alternatively be installed in some other arrangement, for example with sprue bushings 7 extending upwardly.

By virtue of the predetermined point of flexure 25, some relative freedom of movement exists between the free lower end of the sprue bushing 7 and the manifold block 1. As a result, when the hot passage manifold system is assembled, the free end of the sprue bushing 7 aligns and orients itself in the nozzle plate 14 according to the centering segment 22, even if there is a horizontal dislocation relative to the exit opening 4 because of manufacturing tolerances. In operation, this mobility of the sprue bushing 7 means that heat expansions of the heated manifold block 1 transverse to the centerline of the sprue bushing 7 (that is, horizontally in the drawing) can be tolerated without any resulting displacement between the top of the sprue bushing 7 and the bottom of the manifold block 1.

The electrical connections (not shown) of the heating jackets 9 of all of the sprue bushings 7 of the hot passage manifold system shown are preferably integrated into a common electrical connection. That connection in turn is integrated with the electrical connection of the tubular heating member 5 of the manifold block 1—preferably by way of lines laid in a flexible tube—to make a common plug connection.

During manufacture, the manifold block 1 with the sprue bushings 7 securely screwed into it and complete with electric wiring is assembled and checked for electrical operation. Thereafter the unit is delivered to the tooling shop where it is connected to the injection molding mold by inserting the several sprue bushings 7 into the recesses 13 of the nozzle plate 4. No further electric wiring or fitting operations are required.

Since the heated manifold block 1 is in direct contact with adjacent parts at only a few locations, effective heat insulation is achieved; thermal bridges that would tend to heat adjacent parts, especially the injection molding mold, are avoided to a large extent. Heat insulating material is preferably used for the spacers 16 and 17 which are in contact with the manifold block 1. The guide washer 18 also is preferably made of a heat insulating material in order to minimize heat transfer between the sprue bushing 7 and the nozzle plate 14.

The centering of the sprue bushings 7 in the centering segments 22 is accomplished by the guide washers 18, and not the nozzle cap 20. This prevents damage to the face of the nozzle cap 20 during assembly and disassembly.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

It is claimed:

1. An improved hot passage manifold system for supplying molten material to injection molding molds, the system having a heated manifold block with at least one distribution passage, a nozzle plate, and at least one sprue bushing connected to the manifold block at a first end and positioned in a recess in the nozzle plate at a second end, said first end of said sprue bushing in communication with an exit opening of said at least one distribution passages, said improvement comprising:
    means for fixedly and sealingly connecting said sprue bushing to said manifold block at said first end;
    means for fixedly positioning said sprue bushing in said recess in said nozzle plate; and
    peripheral groove means on said sprue bushing between said first and second ends for allowing limited relative movement of said nozzle plate and manifold block.

2. The system as set forth in claim 1 wherein said means for fixedly and sealingly connecting said sprue bushing to said manifold block comprises first threaded means on said first end of said sprue bushing and second threaded means in said manifold block.

3. The system as set forth in claim 2 further comprising block passage centering means for centering said sprue bushing relative to said exit opening of said distribution passage.

4. The system as set forth in claim 3 wherein said block passage centering means comprises a first centering surface portion in said manifold block adjacent said exit opening and a corresponding and mating second centering surface portion on said sprue bushing.

5. The system as set forth in claim 2 wherein said sprue bushing has a nipple at said first end, and said first threaded means are positioned on said nipple.

6. The system as set forth in claim 1 wherein said means for fixedly positioning said sprue bushing in said recess in said nozzle plate comprises a guide washer on said sprue bushing and a mating centering segment in said recess.

7. The system as set forth in claim 1 wherein said peripheral groove means is positioned on the external surface of said sprue bushing adjacent said first end of said sprue bushing.

8. The system as set forth in claim 6 wherein said sprue bushing has an annular heater means thereon and a nozzle cap at said second end, and wherein said guide washer is positioned between said heater means and said nozzle cap.

9. The system as set forth in claim 1 further comprising first means for heating said manifold block and second means for heating said sprue bushing.

10. The system as set forth in claim 9 wherein said second means for heating said sprue bushing comprises annular heater means and has a first electrical connection.

11. The system as set forth in claim 10 wherein said first means for heating said manifold block comprises tubular heater means and has a second electrical connection.

12. The system as set forth in claim 11 wherein said first electrical connection and said second electrical connection are combined into a common plug connector.

13. A heated manifold system comprising:
    a manifold block having at least one distribution passageway therein, said passageway having an exit opening;
    a nozzle plate having a recess therein;
    a sprue bushing having a first end and a second end, said sprue bushing threadedly connected at said first end to said manifold block at said exit opening, said second end of said sprue bushing positioned in said recess in said nozzle plate; and
    peripheral groove means on said sprue bushing between said first and second ends for allowing limited relative movement between said first end and said second end in order to compensate for any manufacturing tolerances and to allow for expansion of said manifold block due to temperature changes.

14. The system as set forth in claim 13 wherein said sprue bushing is screwed into said manifold block.

15. The system as set forth in claim 13 wherein said peripheral groove means is positioned adjacent said first end.

16. The system as set forth in claim 13 further comprising means for centering said sprue bushing in said recess in said nozzle plate.

17. A sprue bushing for use with a heated manifold system, said sprue bushing comprising:
    a body having a first end and a second end;
    thread means on said first end of said body for attaching said body to said manifold system;
    centering means on said second end of said body for centering the body with respect to a recess in a nozzle plate;
    peripheral groove means on said body between said first and second ends for allowing limited movement of said first end relative to said second end when each end is fixedly positioned.

18. The sprue bushing as set forth in claim 17 wherein said peripheral groove means is positioned adjacent said first end.

19. The sprue bushing as set forth in claim 17 wherein said body further has a nipple means at said first end, for attaching said body to said manifold system, said thread means being positioned on said nipple means.

20. The sprue bushing as set forth in claim 17 wherein said centering means comprises an annular guide washer positioned on said body.

* * * * *

UNITED STATES PATENT AND TRADEMARK OFFICE
CERTIFICATE OF CORRECTION

PATENT NO. : 5,269,677
DATED : December 14, 1993
INVENTOR(S) : Kurt Gauler

It is certified that error appears in the above-indentified patent and that said Letters Patent is hereby corrected as shown below:

Column 1, line 41, "misalignment" should be --misalignments--.
Column 1, line 55, "plastic" should be -- (plastic) --.
Column 4, line 15, after "clamp plate" insert --15--.
Column 4, line 16, after "bolted" delete --therefor--.

Signed and Sealed this

Thirtieth Day of August, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,269,677

DATED : December 14, 1993

INVENTOR(S) : Kurt Gauler

It is certified that error appears in the above-indentified patent and that said Letters Patent is hereby corrected as shown below:

Column 7, line 4, after "means is" delete --positioned--.

Signed and Sealed this

Twenty-seventh Day of December, 1994

Attest:

BRUCE LEHMAN

Attesting Officer  Commissioner of Patents and Trademarks